CHANNEL INDICATING DEVICE

Filed Sept. 10, 1963 2 Sheets-Sheet 1

INVENTORS:
RAYMOND S. JOSEPH,
JULIUS KEMENY,
BY Frank J. Thompson
THEIR ATTORNEY.

CHANNEL INDICATING DEVICE

INVENTORS:
RAYMOND S. JOSEPH,
JULIUS KEMENY,

BY Frank J. Thompson
THEIR ATTORNEY.

United States Patent Office 3,149,607
Patented Sept. 22, 1964

3,149,607
CHANNEL INDICATING DEVICE

Raymond S. Joseph, Syracuse, and Julius Kemeny, Liverpool, N.Y., assignors to General Electric Company, a corporation of New York Filed Sept. 10, 1963, Ser. No. 307,899
5 Claims. (Cl. 116—124.2)

This invention relates to an indicating device and, more particularly, to a combination television UHF-VHF channel indicating device.

It is one object of this invention to provide an attractive channel indicator which indicates both UHF and VHF channel selection through a single indicator window.

It is another object of this invention to provide a combination channel indicator which is compact, easy to assemble and mount, and relatively inexpensive to manufacture.

Further objects and advantages of this invention will be better understood from the following description referred to in the accompanying drawings and the features of novelty which characterize this invention are pointed out with particularity in the claims annexed to and forming part of this specification.

In accordance with the teachings in one form of this invention, a combination UHF-VHF television channel indicator includes a cylindrical unit mounted behind and adjacent an elongated channel-indicating window of a television receiver. The cylindrical unit includes a rotatable drum on the circumferential surface of which VHF channel members are imprinted along a helical line. An axially elongated aperture is provided through the drum between two successive VHF channel numbers. Interiorly of the rotatable drum is a stationary member along the length of which UHF channel numbers are imprinted.

Rotation of the drum conjointly with actuation of the television VHF tuner results in the alignment of a single VHF channel member with the channel indicating window or alignment of the axially elongated aperture with the channel window. In the latter case, all of the UHF channel numbers are then exposed to the viewer and an axially movable UHF channel indicating pointer, which is drivingly interconnected with the UHF tuner mechanism, indicates the particular UHF channel to which the receiver is tuned.

In the drawings, FIGURE 1*a* and 1*b* illustrate a television receiver employing the present invention, FIGURE 1*a* illustrating the receiver tuned to particular VHF channel while FIGURE 1*b* illustrates a receiver tuned to a particular UHF channel.

Figure 1A:
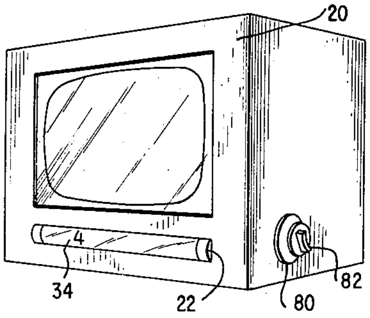
Figure 1B:
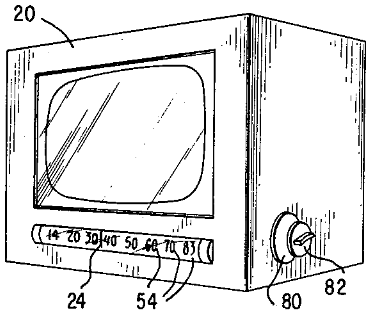

With reference to the drawings, and particularly FIGURES 1*a* and 1*b*, the front panel 20 of a television receiver which employs both UHF and VHF tuners has an elongated channel indicating window 22 therein through which both the UHF and VHF channel indicators are individually viewable. As may be seen in FIGURE 1*a* when VHF channels are selected a single number indicating the particular channel selected appears in the channel indicating window 22. However, as may be seen in FIGURE 1*b*, when a particular UHF channel is desired, all of the UHF channels appear simultaneously in the channel indicating window and a channel indicating pointer 24 indicates the particular UHF channel selected. This dual system of channel indication is accomplished by placing immediately behind the channel indicating window 22 a combination UHF-VHF channel indicating device 26, shown generally in FIGURE 2, which is operatively connected to both a UHF tuner 28 and a VHF tuner 30.

Figure 2:
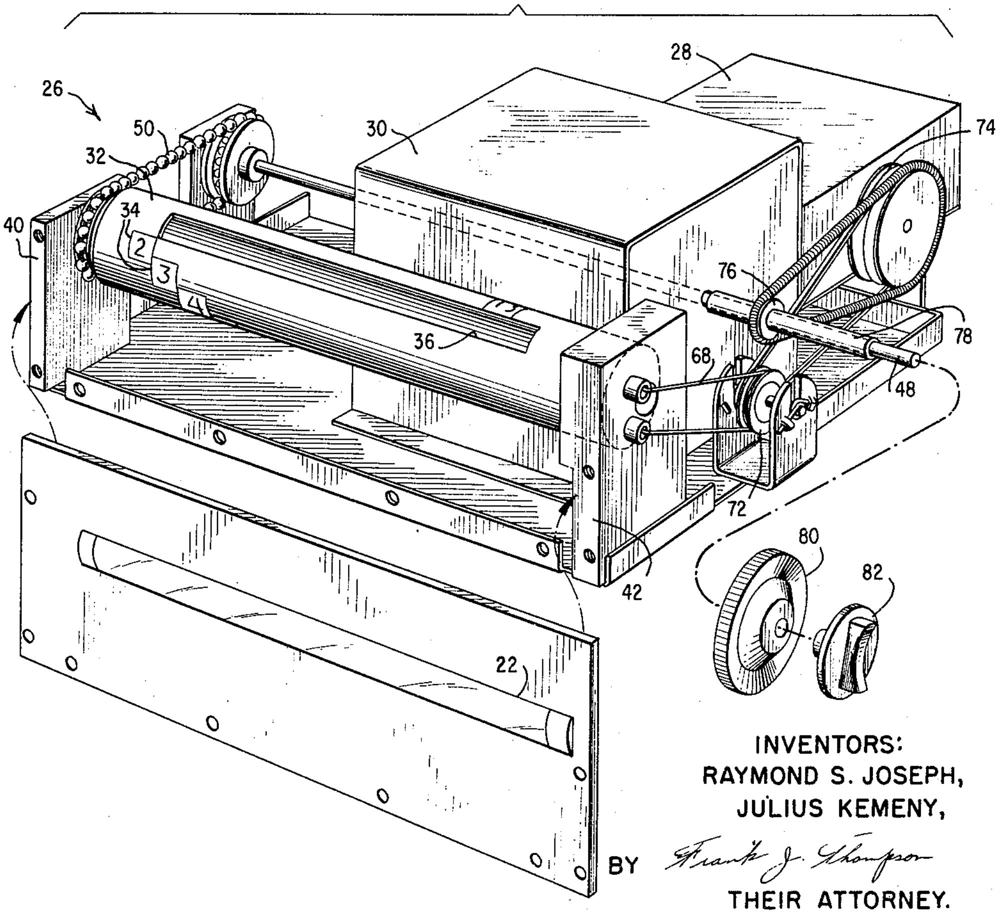
FIGURE 2 is a perspective view of the interior of a television receiver employing the present invention.
Figure 3:
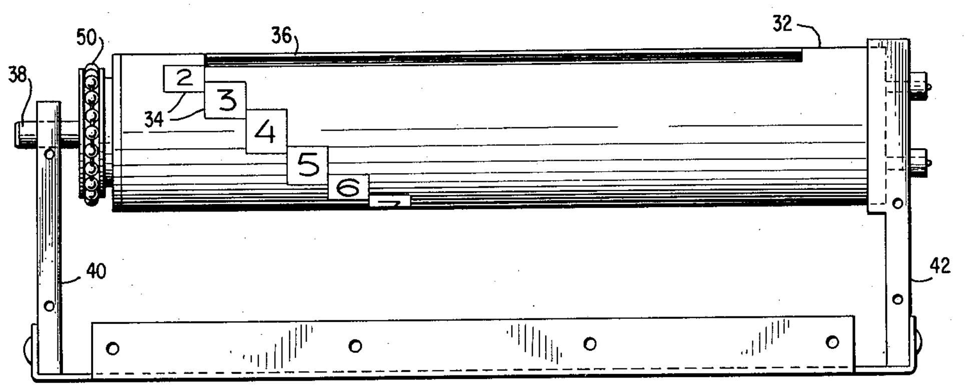
FIGURE 3 is a front elevational view of a VHF channel indicating drum.
Figure 4:
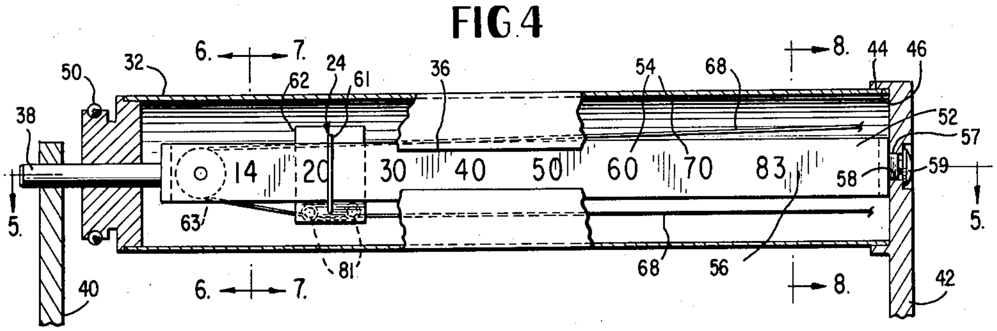
FIGURE 4 is a sectional, front, elevational view of a VHF channel indicating drum having a UHF channel indicating system mounted interiorly therein.
Figure 5:
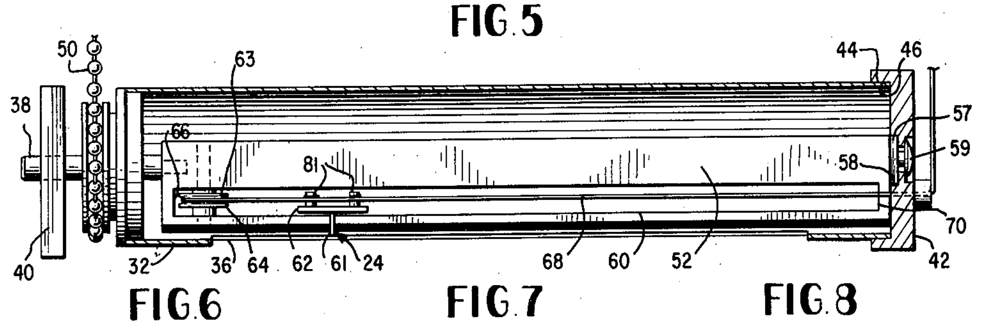
FIGURE 5 is a plan sectional view taken along the line 5—5 of FIGURE 4.
Figure 6:
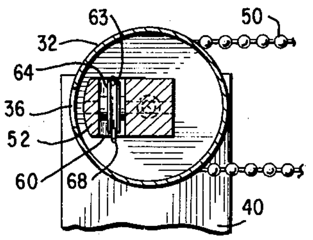
FIGURE 6 is an end sectional view taken along the line 6—6 of FIGURE 4.

The VHF portion of the combination channel indicator comprises an opaque, hollow cylindrical member or drum 32 on the outer surface of which the VHF channel numbers 34 are imprinted. The numbers are imprinted on the periphery of the drum along a helical line as shown in FIGURES 2 and 3 and are circumferentially spaced such that only one number is visible through the channel indicating window 22 at any one time, the numbers being successively visible at differing points along the length of the window 22. An axial elongated aperture 36 is provided through the drum 32 between two VHF channel indicator numbers such as VHF channel 2 and the VHF channel 13 as shown. One end of the cylindrical drum is rotatably mounted immediately behind the television front panel 20 by means of a stationary mounting pin 38, as seen in FIGURES 3–5, and which is supported by a support block 40 and which projects axially through that end of the drum 32. The other end of the drum is rotatably supported by a support block 42 by means of a male journal surface 44 which mates with a female journal surface 46 as may be seen in FIGURE 4.

VHF channel selection is accomplished by rotating a VHF tuner selector shaft 48 which operates the VHF tuning mechanism and, in turn, rotates the drum 32 through a mechanical transmission system such as a chain and sprocket arrangement 50. The particular channel to which the VHF tuner is tuned is indicated by the channel indicating numbers 34 which successively individually appear in the channel indicating window 22, as illustrated in FIGURE 1*a*.

Fixedly mounted interiorly of the drum 32 is a stationary member or bar 52 (FIGURE 4–8). UHF channel numbers 54 are imprinted on an elongated surface 56 of the stationary member 52, the elongated surface being permanently aligned with the channel indicating window 22 and having dimensions approximately equal to the dimensions of the drum aperture 36. When the drum is rotated such that the aperture 36 is aligned with the television receiver channel indicating window 22, all of the UHF channel numbers 54 are viewed simultaneously therethrough (FIGURE 1*b*).

The stationary member 52 is mounted at one end within the television receiver by the mounting pin 38 which serves as a mounting means for both the stationary member 52 and the drum 32. The other end of the member is mounted by a key 57 having a non-circular contour which fits within a key way 58 in the stationary mount 42 to prevent rotation of the stationary member 52. The key is fixedly held in place by means of a screw 59.

Figure 7:
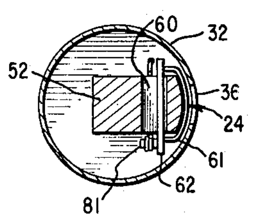
FIGURE 7 is an end sectional view taken along the line 7—7 of FIGURE 4.
Figure 8:
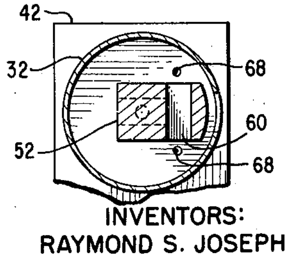
FIGURE 8 is an end sectional view taken along the line 8—8 of FIGURE 4.

The particular UHF channel to which the UHF tuner 28 is tuned is indicated by a linearly movable channel indicating pointer 24 movably mounted to traverse the length of the elongated surface 56 on which the UHF channel numbers are imprinted. A vertical, longitudinal slot 60 is provided near the front of the stationary member 52 in which the pointer mounting means is housed. The pointer 24 consists of a thin, U-shaped member 61 mounted on a plate 62. The U-shaped member 61 is vertically oriented and fits over the front of the stationary member 52 so that the base of the U-shaped member is disposed on the front side of the stationary member 52, between it and the drum aperture 36 as shown in FIGURES 4, 5 and 7. The plate 62 is located within the slot 60 and is moved linearly by a belt and pulley arrangement 63. A pulley 64 is rotatably mounted within the slot 58 and at one end 66 thereof and a continuous belt 68 runs the length of and within the slot 60, passes through the other end 70 of the slot 60, and is drivingly connected to an intermediate pulley 72. The intermediate pulley 72 is one of a series of pulleys 72, 74, 76 which operatively connects the pulley and belt arrangement 63 with a shaft 78 which is rotated by a UHF channel selector knob 80 (FIGURE 2).

The plate 62 is fixedly attached to the belt 68 by means of a pair of prongs 81 around which one side of the belt is wrapped. Rotation of the selector knob 80 rotates the shaft 78 which, through the pulley series 72, 74, 76, operates pulley 64 and belt 68 resulting in movement of the plate 62 and U-shaped member 61 along the length of the elongated surface 56.

In operation, selection of a particular UHF channel is performed as follows. The viewer rotates a VHF channel selection dial 82 which, through a shaft 48 and chain and sprocket arrangement 50, rotates the VHF drum 32 successively exposing individual VHF channel numbers 34 through the channel indicating window 22 until the drum rotates sufficiently to align the aperture 36 with the channel indicating window 22. At that time the entire elongated surface 56 having the UHF channel numbers 54 imprinted thereon is visible through the channel indicating window 22. Selection of the particular UHF channel is then achieved by rotation of the UHF channel selector knob 80 which rotates a shaft 78 and, through a series of pulleys 72, 74, and 76, is operatively connected to the UHF tuner 28 and the channel indicating pointer 24. Rotation of knob 80 thus causes the pointer 24 to traverse axial the length of the elongated surface 56 successively indicating the particular channel which corresponds to the particular frequency to which the UHF tuner is tuned.

It should be understood that while the invention has been specifically described in terms of a cylindrical VHF channel indicating drum, similar results could be obtained through the substitution for the drum of a translating plate having the channel numbers imprinted on the surface thereof. The channel numbers would be properly spaced such that only a single number is exposed to the channel indicating window at a given time and an elongated aperture would be provided in the translating plate to similarly expose the UHF channel numbers as described above. Additionally, while the invention described above utilizes a UHF channel indicating pointer 24, the invention could also be practiced by the used of other channel indicating means, for example, a light beam.

Although the specific apparatus of the invention has been shown and described above, it will be apparent to those skilled in the art that numerous changes, combinations and substitutions of equivalents might be made. It is therefore contemplated by the claims which conclude this specification to cover all such modifications as fall within the true spirit and scope of this invention.

What we claim is:

1. A combination UHF-VHF channel indicating device comprising:

(*a*) a first member having a plurality of first channel numbers imprinted thereon and having an elongated aperture therethrough, (*b*) first tuning means for moving said first member, each of said first numbers and said aperture being spaced from one another along the direction of motion of said first member, said first tuning means causing a selected one of said first numbers on said aperture to be disposed at a predetermined position, each of said first numbers representing a particular frequency to which said first tuning means is tuned, (*c*) a stationary member located adjacent said first member and having a plurality of second channel numbers imprinted on an elongated surface thereof said first tuning means causing said aperture to be aligned with said elongated surface when said aperture is in said predetermined position whereby said second numbers are viewable through said aperture, (*d*) indicating means movably mounted adjacent said elongated surface and viewable through said aperture, and (*e*) second tuning means for causing said indicating means to traverse said elongated surface for indicating the frequency to which said second tuning means is tuned.

2. A combination UHF-VHF channel indicating device comprising:

(*a*) a rotatably mounted cylindrical drum having a plurality of first channel numbers imprinted thereon and having a longitudinal aperture therethrough, each of said first numbers and said aperture being circumferentially spaced from one another, (*b*) first tuning means drivingly connected to said drum for causing a selected one of said first numbers on said aperture to be disposed at a predetermined position, each of said first numbers representing a particular frequency to which said first tuning means is tuned, (*c*) a stationary member located within said drum and having a plurality of second channel numbers imprinted on an elongated surface thereof, said first tuning means causing said aperture to be aligned with said elongated surface when said aperture is in said predetermined position whereby said second numbers are viewable through said aperture, (*d*) indicating means movably mounted adjacent said elongated surface and viewable through said aperture, and (*e*) second tuning means causing said indicating means to traverse said elongated surface for indicating the frequency to which said second tuning means is tuned.

3. A combination UHF-VHF channel indicating device as defined in claim 2 wherein said first numbers are imprinted along a helical line around the circumference of the drum whereby said first numbers are successively visible at differing points along the length of said predetermined position.

4. A combination UHF-VHF channel indicating device as defined in claim 2 wherein said indicating means comprises:

(*a*) a pulley and belt arrangement mounted on said stationary member, said arrangement being operatively connected to said second tuning means, and (*b*) an indicator fixedly attached to the belt for movement along said elongated surface corresponding to variation in the frequency to which said second tuning means is tuned.

5. A combination UHF-VHF channel indicating device comprising:

(*a*) a rotatably mounted opaque cylindrical drum having a plurality of VHF channel numbers imprinted on the periphery of said drum along a helical line and having an elongated axial aperture therethrough, each of said VHF numbers and said aperture being circumferentially spaced from one another, (*b*) VHF tuning means drivingly connected to said drum causing a selected one of said VHF channel numbers on said aperture to be disposed at a predetermined position, each of said VHF numbers representing a particular frequency to which said VHF tuning means is tuned, (*c*) a stationary member located within said drum and having a plurality of UHF channel numbers imprinted on an elongated surface thereof, the dimensions of said elongated surface being substantially equal to the dimensions of said aperture, said VHF tuning means causing said aperture to be aligned with said elongated surface when said aperture is in said predetermined position whereby said UHF numbers are viewable through said aperture, (*d*) UHF channel indicating means comprising:

(i) a pulley and belt arrangement mounted on said stationary member and (ii) a UHF channel indicator said UHF channel numbers and viewable through said aperture, said indicator being fixedly attached to the belt, (*e*) UHF tuning means operatively connected to said belt for causing said UHF channel indicator to traverse said elongated surface for indicating the frequency to which said UHF tuning means is tuned.

No references cited.